(12) United States Patent
Gupta et al.

(10) Patent No.: US 6,437,262 B1
(45) Date of Patent: Aug. 20, 2002

(54) HANDLE OPERATING ASSEMBLY FOR AN ELECTRIC DISCONNECT SWITCH

(75) Inventors: Pankaj Gupta, Uttranchal; Ranjit Sunil Acharya, Nagpur; Amit Narang, Chandigarh, all of (IN); John Joseph Struble, Jr., Mebane, NC (US); Edgar Yee, Chapel Hill, NC (US); David Edward Thorn, Burlington, NC (US); Elwood Rau Combs, Mebane, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/795,205

(22) Filed: Feb. 28, 2001

(51) Int. Cl.$^7$ ................................................ H01H 9/20
(52) U.S. Cl. .................... 200/50.19; 200/400; 200/330; 200/331; 200/334
(58) Field of Search .......................... 200/50.01, 50.02, 200/50.06, 50.11, 50.12, 50.17, 50.19, 400, 401, 500, 501, 330–332, 334, 337

(56) References Cited

U.S. PATENT DOCUMENTS

| | | | | |
|---|---|---|---|---|
| 3,496,320 A | * | 2/1970 | Wasileski | 200/331 |
| 3,714,387 A | * | 1/1973 | Bernier | 200/296 |
| 4,598,183 A | * | 7/1986 | Gardner et al. | 200/330 |
| 4,785,145 A | | 11/1988 | Owens et al. | 200/162 |
| 4,884,164 A | | 11/1989 | Dziura et al. | 361/97 |
| 4,945,450 A | | 7/1990 | Sabatella et al. | 361/334 |
| 5,019,676 A | * | 5/1991 | Heckenkamp | 200/50.18 |
| 5,319,168 A | * | 6/1994 | Hutko et al. | 200/331 |
| 5,424,911 A | | 6/1995 | Joyner et al. | 361/616 |
| 5,657,193 A | | 8/1997 | Purkayastha | 361/23 |
| 6,087,602 A | * | 7/2000 | Bernier et al. | 200/50.11 |

* cited by examiner

Primary Examiner—Michael Friedhofer
(74) Attorney, Agent, or Firm—Cantor Colburn LLP

(57) ABSTRACT

A handle operating assembly suitable for use with an electric disconnect switch assembly having a circuit breaker. The handle operating assembly comprises a handle operator extending outward from the electric disconnect switch and movable between an ON and an OFF position and a face plate having a slot therein. The handle operator slidably moves in the slot between the OFF position and the ON position. The face plate mounts to the electric disconnect switch assembly and is positionable between a first position to prevent access to the circuit breaker and a second position to provide access to the circuit breaker. The handle operating assembly provides ease of accessibility to the electrical disconnect switch and ease of assembly.

26 Claims, 10 Drawing Sheets

HANDLE OPERATING ASSEMBLY FOR AN ELECTRIC DISCONNECT SWITCH

BACKGROUND OF THE INVENTION

This invention relates to circuit breakers, and, more particularly, to a motor control center circuit breaker assembly.

Motor control centers (units), such as described in U.S. Pat. No. 5,424,911 entitled Compact Motor Controller Assembly, contain several components related to electric motor operation such as electric contactors, circuit breakers, power supply transformers, disconnect switches and the like.

An electric disconnect switch is described in U.S. Pat. No. 4,785,145 entitled Modular Electrical Disconnect Switch, and one such circuit breaker is described in U.S. Pat. No. 4,884,164 entitled Molded Case Circuit Interrupter. The use of a circuit breaker for both motor protection and switch functions is described in U.S. Pat. No. 4,945,450 entitled Modular Electric Switch-Circuit Breaker Assembly. A unit combining both circuit breaker and contactor functions is found in U.S. Pat. No. 5,657,193 entitled Electronic Control Module for Motor Controller Units.

In a motor control unit, it is sometimes necessary to access the circuit breaker (electric disconnect switch) to perform maintenance or routine inspections. To do so requires the disassembly and removal of the handle sub assembly, which frequently results in many loose parts that can be misplace or fall into the motor control unit. Therefore, the ability to easily access the circuit breaker by removing the handle sub assembly is desirable.

BRIEF SUMMARY OF THE INVENTION

The above discussed and other drawbacks and deficiencies of the prior art are overcome or alleviated by a handle operating assembly suitable use with an electric disconnect switch assembly having a circuit breaker. In an exemplary embodiment of the present invention, the handle operating assembly comprises a handle operator extending outward from the electric disconnect switch and movable between an ON and an OFF position and a face plate having a slot therein. The handle operator slidably moves in the slot between the OFF position and the ON position. The face plate mounts to the electric disconnect switch assembly and is positionable between a first position to prevent access to the circuit breaker and a second position to provide access to the circuit breaker.

BRIEF DESCRIPTION OF THE DRAWINGS

Referring to the exemplary drawings wherein like elements are numbered alike in the FIGS.

DETAILED DESCRIPTION OF THE INVENTION

Figure 1:
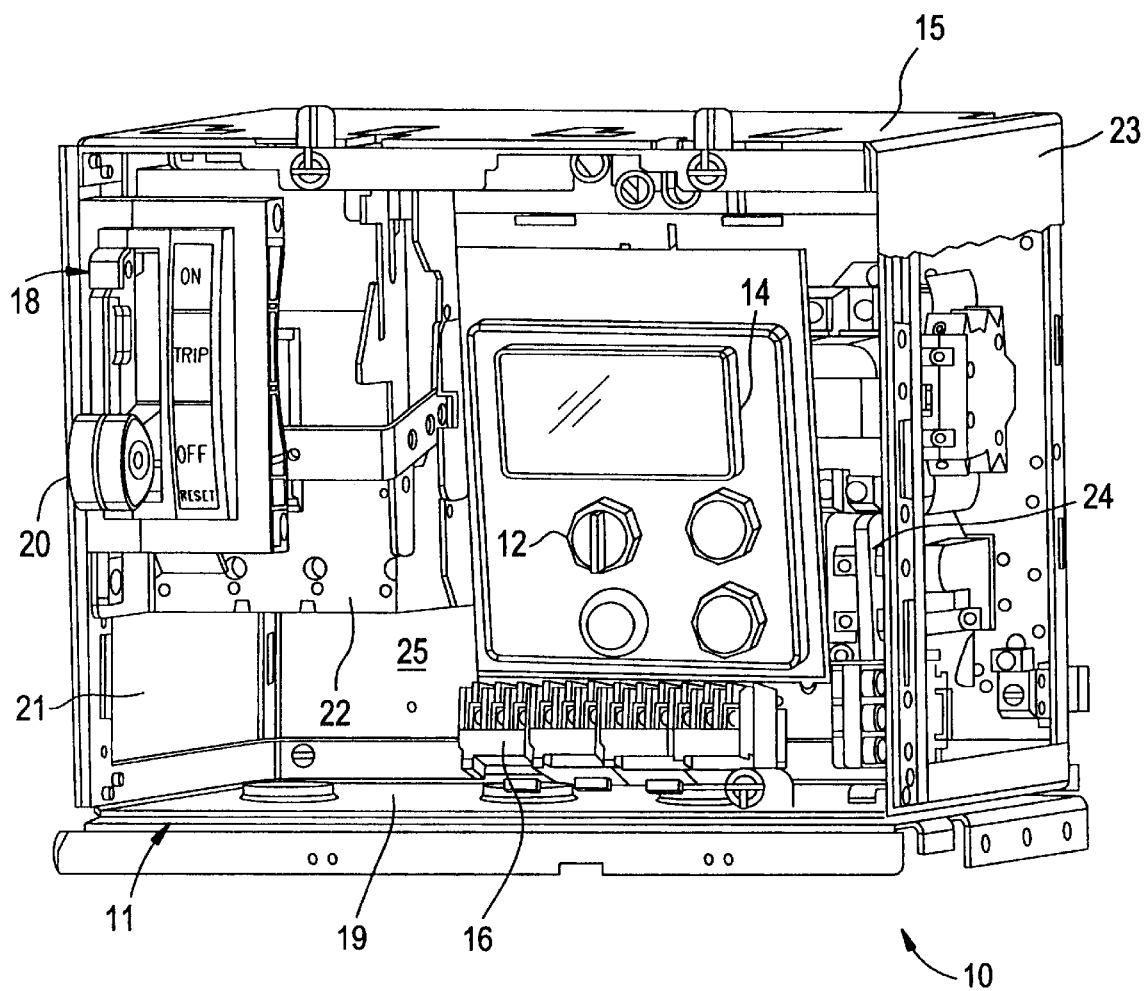
FIG. 1 is a front perspective view of a motor control center containing a circuit breaker.

Referring to FIG. 1, a motor control center 10 is generally shown. An enclosure 11 includes control knobs 12 and an indicator window 14 for providing access to electrical components, such as a motor contactor unit 24 similar to that described within the aforementioned U.S. Pat. No. 5,657,193, which is incorporated by reference. As shown in FIG. 1, enclosure 11 includes a cover (top) 15, an opposing bottom 19, opposing side walls 21, 23, which connect the bottom 19 and the cover 15, and a rear wall 25. Electrical connection between the electrical components and an associated electrical distribution system is made by terminal connectors 16 located on the front of the enclosure 11. A circuit breaker assembly (electric disconnect switch assembly) 18, in this exemplary embodiment of the invention, includes a handle operating assembly (handle operating mechanism) 20 extending from the front of enclosure 11 for providing manual operation of a circuit breaker (electrical disconnect switch) 22 and is attached to the rear wall 25 of enclosure 11 in the manner to be described below.

Figure 2:
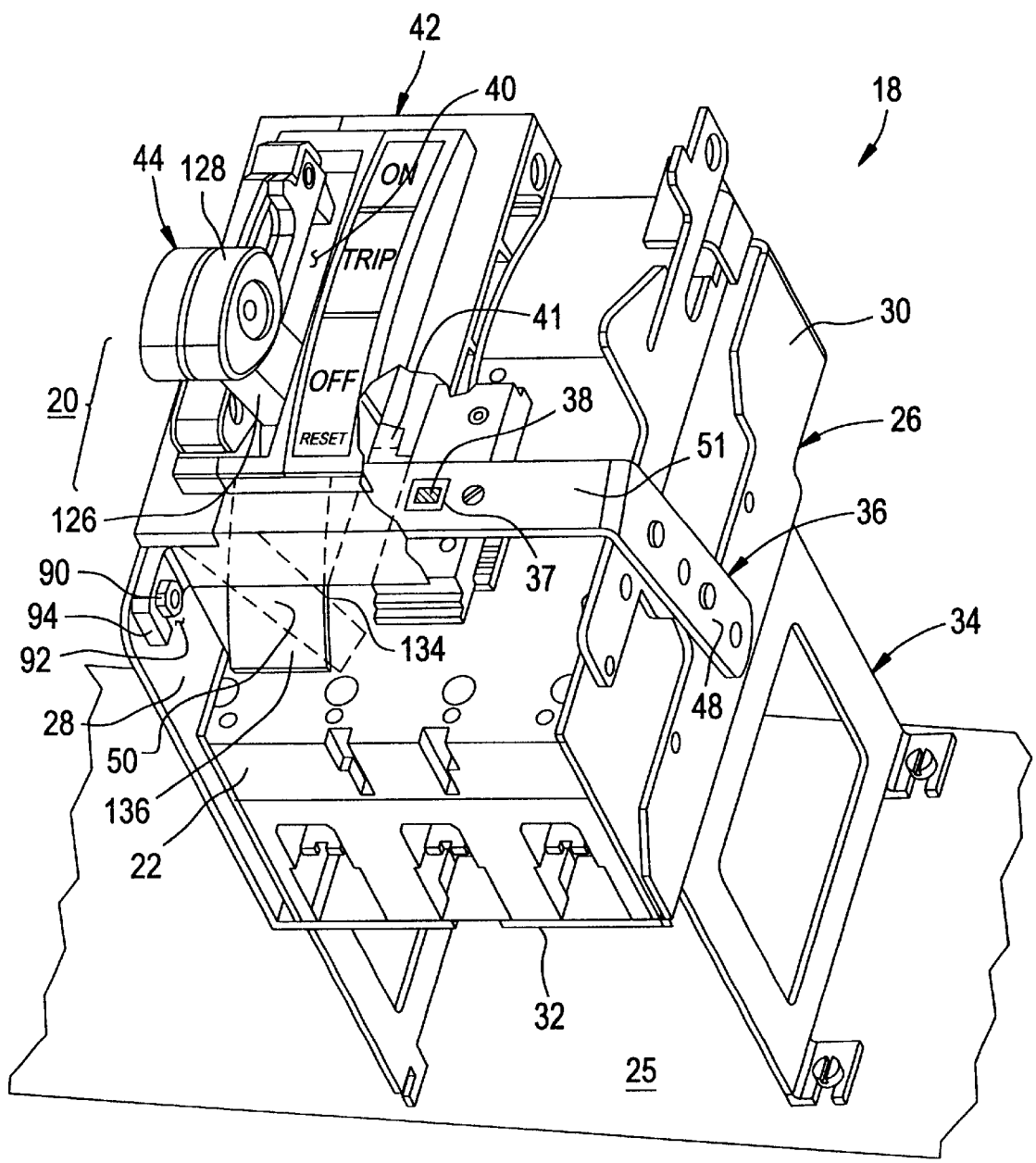
FIG. 2 is a perspective view of a handle operating assembly and a circuit breaker assembly within the motor control center of FIG. 1.
Figure 3:
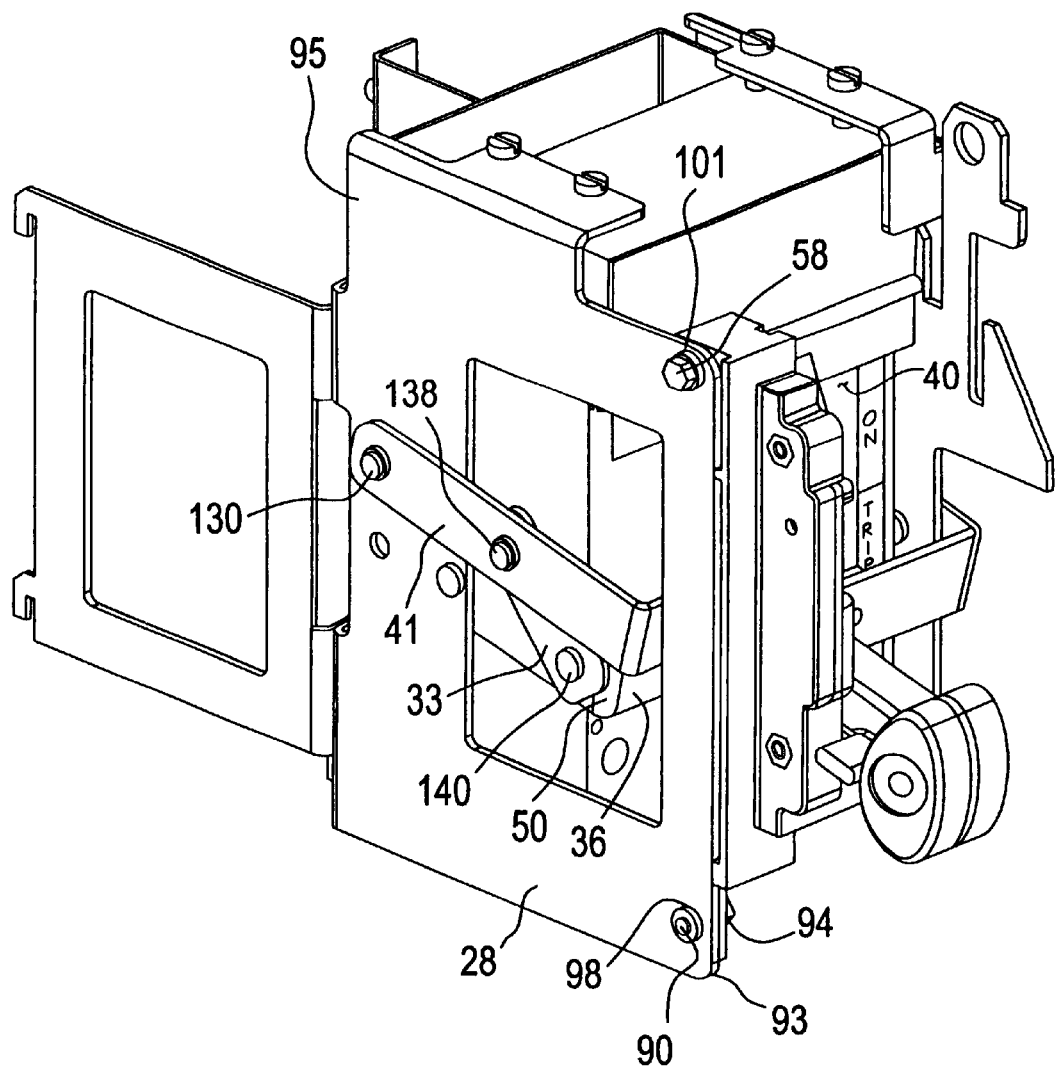
FIG. 3 is a side perspective view of the handle operating assembly of FIG. 2.

Referring to FIGS. 2, and 3, the mounting of the circuit breaker assembly 18 and in particular the handle operating assembly 20 within the enclosure 11 will be described.

The circuit breaker assembly 18 attaches to rear wall 25 through an accessory enclosure support 34. The circuit breaker 22 is mounted on the handle support assembly 26 (FIG. 2). The handle support assembly 26 is defined by a pair of opposing sidearms 28, 30 with a bottom connecting bight 32. The circuit breaker 22 is mounted to bottom connecting bight 32 which is mounted to the accessory enclosure support 34 using mechanical fasteners (not shown). The circuit breaker 22 is positioned on the bottom bight 32 intermediate the sidearms 28, 30 of the handle support assembly 26. Sidesidearm 28 includes an end 93 and an opposing end 95. End 95 is proximate to the accessory enclosure support 34. End 93 of sidesidearm 28 includes an aperture 98 and an aperture 101. Apertures 98, 101 are located in opposing corners of end 93 and accept mechanical fasteners 90, 58, respectively. Preferably, mechanical fasteners 90, 58 are screws.

A U-shaped actuator 36 extends across the top of the handle support assembly 26 to provide a circuit breaker handle access slot 37. A circuit breaker operating handle 38 extends through access slot 37. The U-shaped actuator 36 comprises a top bight 51, an angled sidearm 48 and an angled sidearm 50 (shown in phantom). Angled sidearms 48, 50 are positioned on opposite sides of the circuit breaker 22 and extend alongside the circuit breaker operating handle (switch) 38 for picking up the logic of the position of the circuit breaker operating handle 38 as it moves between ON, TRIP, OFF and RESET positions.

The handle operating assembly 20 in mounted on a face plate 42. Face plate 42 includes an elongated slot 40 for transfer of a handle operator 44. Handle operator 44 includes a base 53 having a bottom side 134 and an opposing top side 136. A stem portion 126 extends from the top side 136 and includes a handle 128 extending there from for use by the end user.

Figure 6:
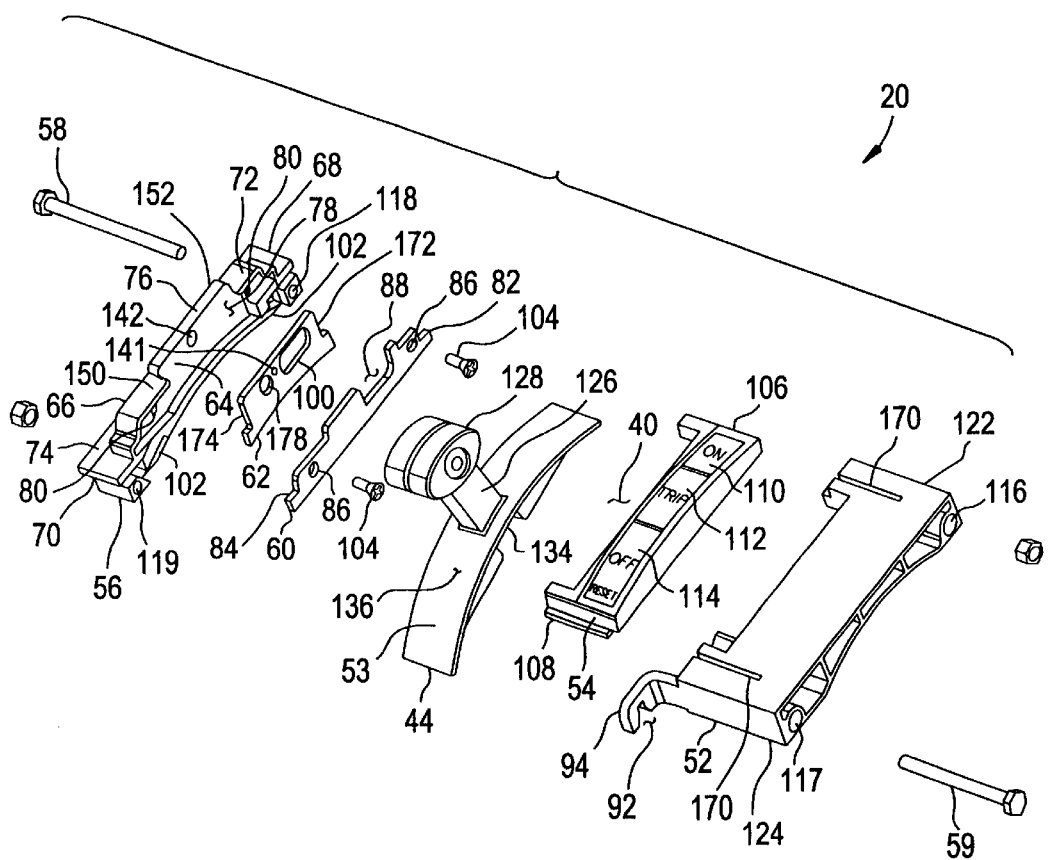
FIG. 6 is an assembly view of the components of the handle operating assembly of FIG. 3.

An arm 94 is integrally formed with the face plate 42 and will be further detailed in reference to FIG. 6.

Figure 4:
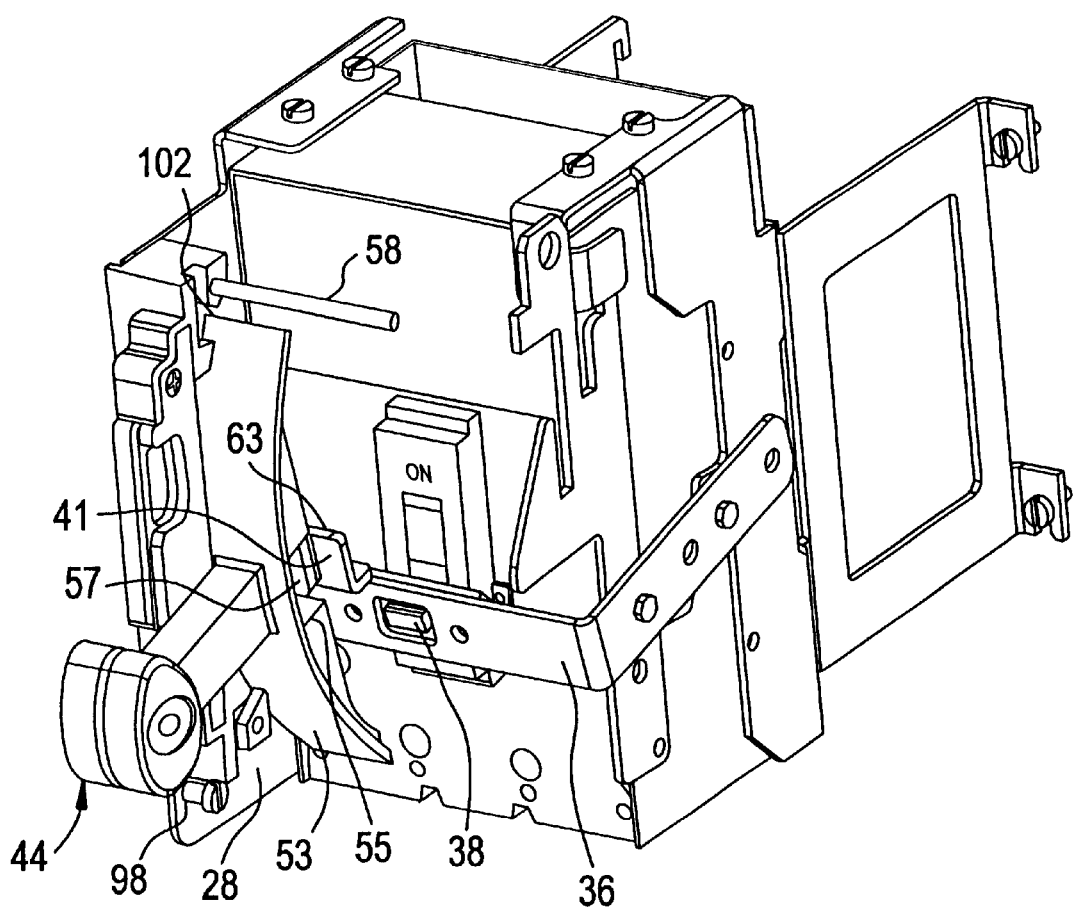
FIG. 4 is a perspective view of a circuit breaker within the the motor control center of FIG. 1 including a partial view of the handle operating; assembly.
Figure 5:
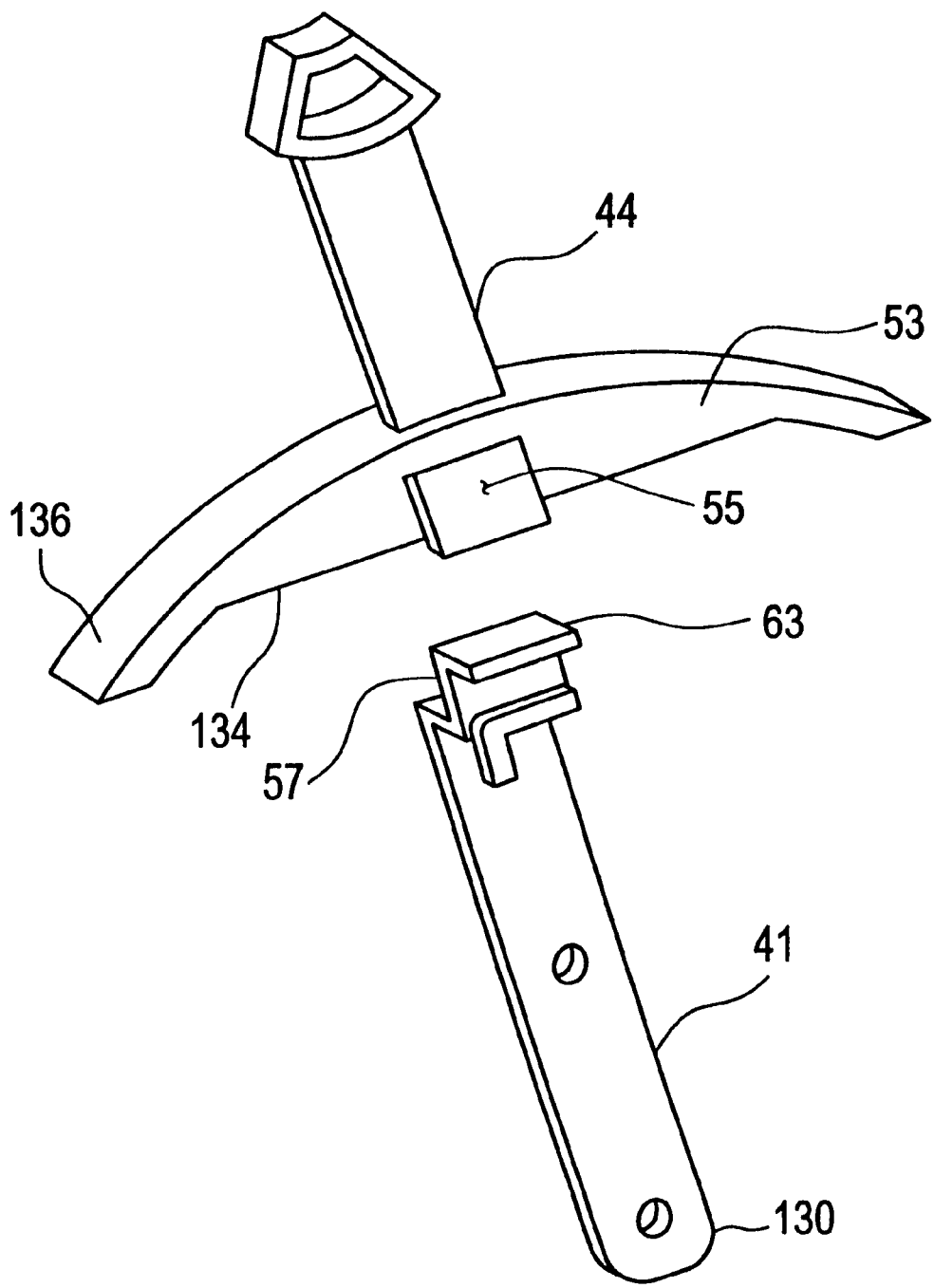
FIG. 5 is a perspective view of a handle operator and a handle link of the handle operating assembly of FIG. 4.

Referring to FIGS. 3, 4 and 5, the handle operating assembly will be described in further detail. FIG. 5 shows the handle operator 44 and a handle link (link) 41.

A link member 33 (FIG. 3) having an end 138 and an opposing end 140 is shown in FIG. 4. End 138 is connected to the link 41 and end 140 is connected to the actuator 36 thus effecting the connection between the actuator 36 and the link 41. The link 41 includes an end 130, and an opposing end 63. End 130 is mounted to the sidearm 28, preferably with the use of mechanical fasteners. End 63 of the link 41 contains a L-shaped section 57. An opening 55 located in the base 53 of the handle operator 44 releasably engages end 63 and preferably, the L-shaped section 57. In this way, the link 41 is actuated by the handle operator 44.

As described hereinabove, the handle operator 44 is movable within elongated slot 40 between the RESET position, at one end of slot 40, to the ON position, at an opposite end of slot 40. Moving the handle operator 44 to the OFF position separate a pair of main contacts (not shown) within the circuit breaker 22 to stop the flow of electrical current through the main contacts. Moving the handle operator 44 to the ON position brings the main contacts into contact to allow the electrical current to flow through the main contacts to a protected load. When the circuit breaker 22 is tripped, the handle operator 44 will move to an intermediate position to indicate the TRIP position. To reset the circuit breaker 22, the handle operator 44 is first moved to the RESET position.

Referring to FIG. 6, the components of the handle operating assembly 20 are shown prior to assembly relative to the circuit breaker 22 (FIG. 1).

The handle operating assembly 20 includes a segment 52, an indicator segment 54, a segment 56, a handle operator 44 and a support plate 60. A side plate 62 is also shown. Segments 52, 54, 56 and support plate 60 form the face plate 42 (FIG. 2). The segments 52, 54, 56, support plate 60 and handle operator 44 of the handle operating assembly 20 are preferably manufactured using a stereo lithography process.

Segment 52 includes an end 122 and an opposing end 124. Proximate ends 122, 124 are apertures 116, 117, respectively accessible from the exterior of the handle operating assembly 20 and suitable for accepting mechanical fasteners 58, 59, respectively. Arm 94 is shown in detail as integrally formed with segment 52 and includes a cutout 92 that aligns with aperture 98 of the sidearm 28 of the handle operating assembly 20.

Indicator segment includes an end 106 and an end 108. Indicator segment is portioned into an ON, TRIP and OFF sections 110, 112, 114, respectively. The ON section 110 proximate end 106 and marked with "ON" to indicate the "ON" position as described hereinabove. The OFF section 114 proximate end 108 is marked "OFF" to indicate the "OFF" position as described hereinabove. The TRIP section 114 indicates the "TRIP" position of the circuit breaker as described hereinabove, "TRIP" is marked approximately midway between the marks for "ON" and "OFF".

When the circuit breaker 22 is in the OFF, TRIP or ON positions, the handle operator 44 will be adjacent the OFF section 114, TRIP section 112 or ON section 110, respectively thereby providing visual indication to the end user.

Segment 56 includes a base section 74 and a flange section 76 continuous with the base section 74 and a surface 64 facing towards the interior of the assembly and an opposing surface 66. Segment 56 also includes an end 68 and an opposing end 70. Proximate ends 68, 70 are apertures 118, 119 accessible from the exterior of the handle operating assembly 20 and suitable for accepting mechanical fasteners 58, 59, respectively. Aperture 118 proximate end 68 aligns with aperture 101 of sidearm 28.

Surface 64 of the flange section 76 and located at opposing ends 144, 146 are apertures 80. Near end 68 of the flange section 76 is a projection 72 extending preferably towards the center of the segment 56 and similarly, near end 70 of the flange section 76 is a projection 150 that extends inward toward the center of the segment 56. Extending towards the interior of the handle operating assembly 20 and positioned between the projections 72, 150 is a projection 152. The base section 74 includes slots 102 projecting inward toward the interior of the handle operating assembly 20. The surface 64 of the flange section 76, preferably at the top center as shown in FIG. 5 includes a recess 142. It is noted that the flange section 76 which includes the projections 72, 150, 152 and the base section 74 share continuous surfaces 64, 66. Also, projections 72, 150, 152 are contiguous and form part of the outer surface 66 of the segment 56. Segment 56 also has a pocket section 78 formed in the interior of the center portion of the base and flange sections 74, 76 and outlined, in part, by projections 72, 150, 152. There is also provided on the surface 66 of segment 56 a dimple 162.

Finally, support plate 60 includes an end 82 and an end 84. Extending crosswise and proximate to ends 82, 84 are apertures 86. Support plate 60 also includes a cutout 88 proximate to the end 82 where the cutout 88 projects outward towards the exterior of the handle operating assembly 20. Apertures 86 of the support plate 60 are positioned to align with apertures 80 of segment 56.

Slide plate 62 includes an end 172 and an end 174. A tab 176 extends outward from end 172 in the lengthwise direction. Similarly, a tab 96 extends outward from end 174. Slide plate 62 also includes an aperture 178, preferably circular in shape, and sized to accept a padlock and also an aperture 100, preferably oblong in shape, and sized to accept more than one padlock, preferably two. Dimple 162 of segment 56 aligns with aperture 100, cutout 88 and with the TRIP section 112 of the indicator segment 54. Positioned within the slide plate 62, preferably near the top center and most preferably between apertures 178, 100 is a dimple 141. Dimple 141 is aligned with recess 142 of the segment 56.

Referring to FIGS. 2 and 6, the assembly of the handle operating assembly 20 within the enclosure 111 (FIG. 1) will now be described.

The base 53 of the handle operator 44 is slidingly engaged within slots 102 of the base section 74 of segment 56 (FIGS. 4, 5). The slide plate 62 is placed within the pocket section 78 of segment 56 such that it rests on the base 53 of the handle operator 44. Next, the apertures 86 at ends 82, 84 of the support plate 60 are aligned with apertures 80 at ends 68, 70 of the segment 56, respectively such that mechanical fasteners 104 are inserted therethrough securely attaching the support plate 60 to the segment 56 with the slide plate 62 located within the pocket section 78. Once secured in this way, cutout 88 of support plate 60 is aligned with aperture 100 of slide plate 62. Further, once the support plate 60 is attached to the segment 56, the slide plate 62 is permitted vertical movement within pocket section 78. It is also noted that dimple 141 of the slide plate 62 rests inside recess 142 of segment 56 in a snap-fit manner to releasably engage the slide plate 62 inside the pocket section 78 during normal operation of the handle operator 44.

Indicator segment 54 mates between segments 52, 56 forming slot 40. The handle operator 44 is then positioned within slot 40 and between the support plate 60 and the indicator segment 54. End 106 of the indicator segment 54 is aligned on the same side of the handle operating assembly 20 as is end 82 of support plate 60 as well as end 68 of segment 56. Handle operator 44 is free to move within slot 40 from the ON position to the RESET position. It is noted that once assembled in this manner, cutout 88 of support plate 60 is aligned with the trip section 112 of the indicator segment 54.

Next, indicator segment 54 slidingly mates with slots 170 of the segment 52. Apertures 116 of segment 52 are aligned with apertures 118 of segment 56. Aperture 101 of sidearm 28 of the handle support assembly 26 aligns with the aperture 118 located proximate end 68 of segment 56. Any process commonly used in circuit breaker manufacturing can be used to affect the assembly of segments 52, 56, to each other and finally to sidearm 28 of the handle support assembly 26, such as the use of mechanical fasteners 58, 59. Mechanical fastener 58 is inserted through apertures 101, 118 and 116 to thereby attach segments 52 and 56 together and attach the handle operating assembly 20 to sidearm 28. Mechanical fastener 59 is inserted through apertures 117, 119 to thereby attach segments 52 and 56 together. It is noted that once segments 52, 56 are fastened together, the indicator segment 54, handle operator 44 are held in their respective positions as described hereinabove.

Figure 7:
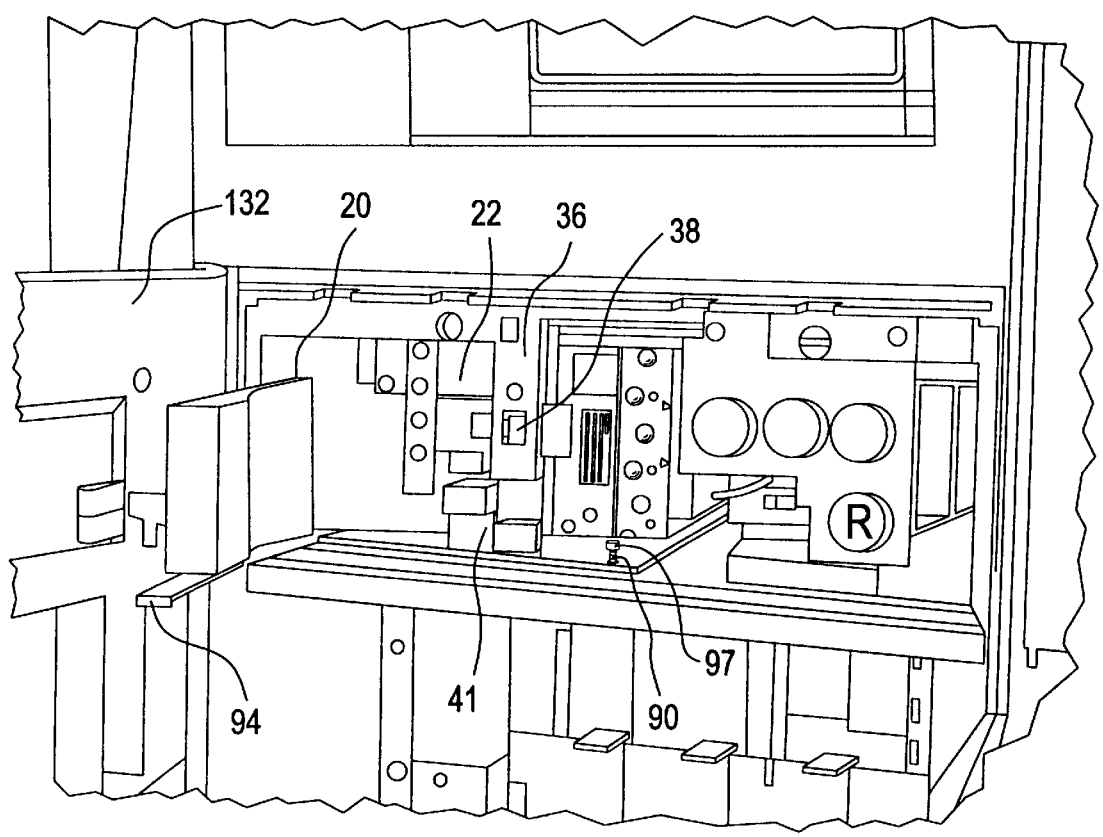
FIG. 7 is a front perspective view showing the handle operating assembly rotated open to provide access to the circuit breaker.

Finally, the handle operating assembly is further fastened to the sidearm 28 by a mechanical fastener 90 that is inserted through aperture 98 in the sidearm 28 and the cutout 92 on arm 94. Preferably, mechanical fastener 90 is a screw and includes a threaded insert 97 (FIG. 7). When the mechanical fastener 90 is tightened, the threaded insert 97 is tightened around the arm 94 thus further securing the handle operating assembly 20 to the sidearm 28.

Figure 8:
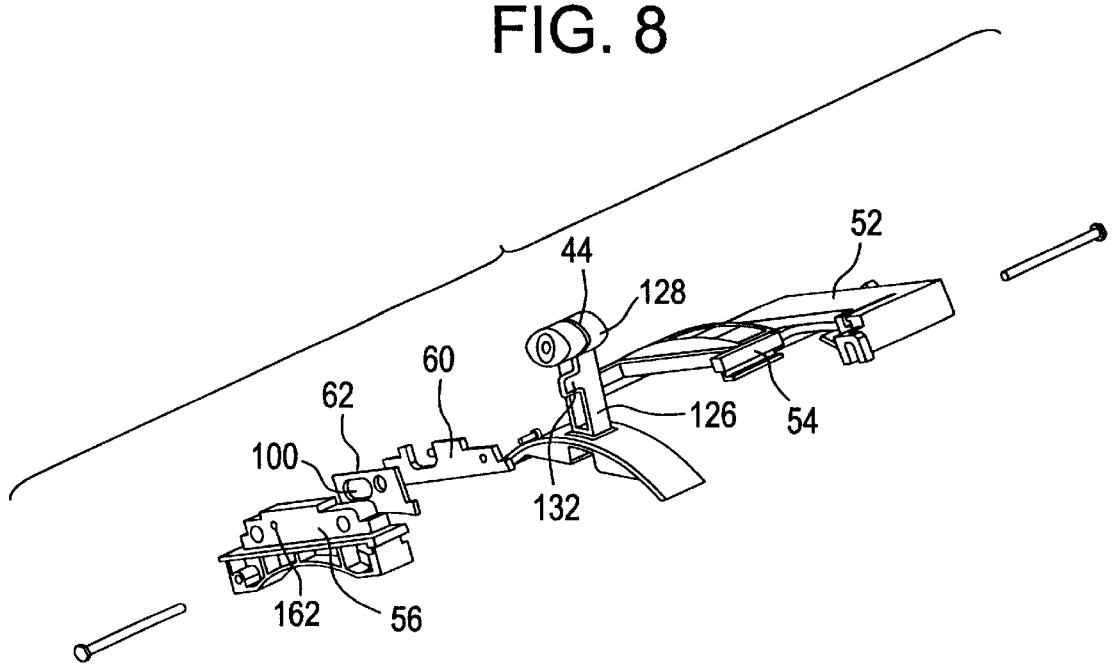
FIG. 8 is an assembly view of the components of the handle operator assembly of FIG. 3 viewed in an opposing direction to that of FIG. 6.
Figure 9:
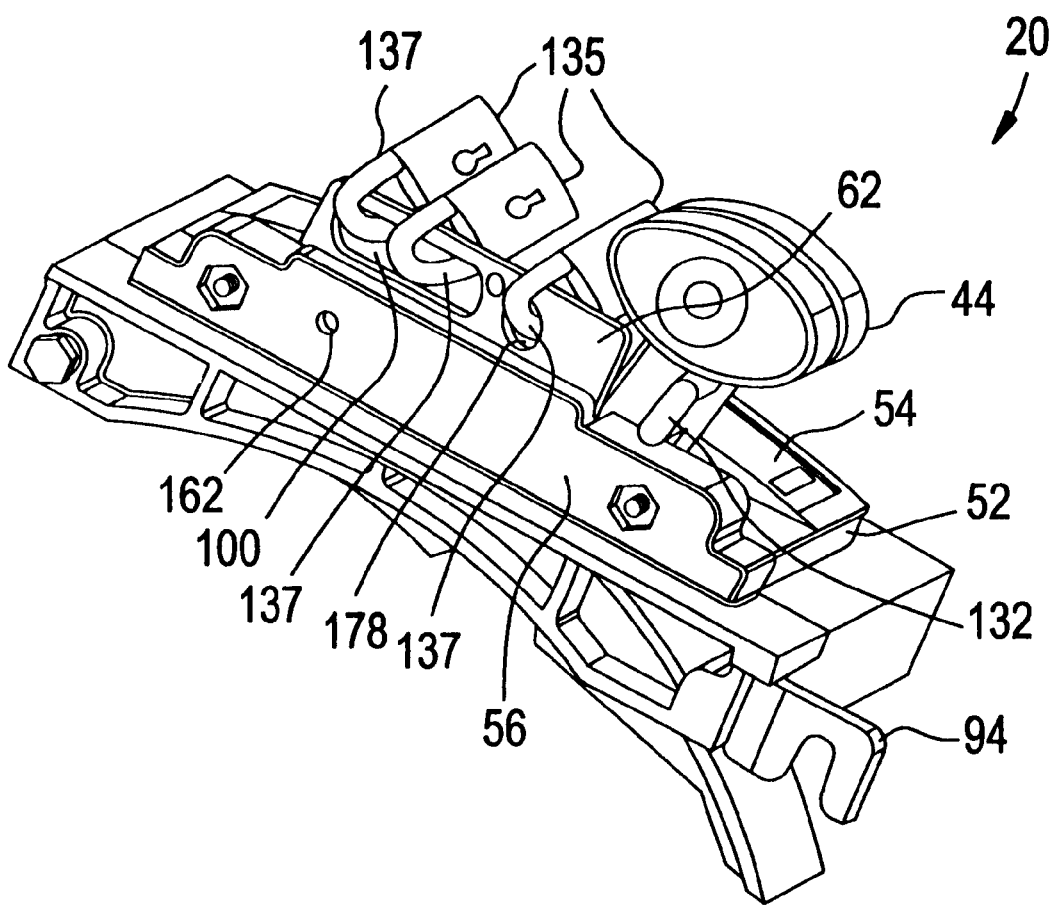
FIG. 9 is a partial perspective view showing the handle operator locked in the OFF position.

Referring to FIGS. 5, 8 and 9, the manner in which the handle operator 44 is locked in the desired OFF or ON position will now be described. FIG. 7 shows the handle operator 44 locked in the OFF position.

To lock the handle operator 44 once it is in the OFF position, the end user pulls the slide plate 62 out from the pocket section 78 through the cutout 88 and attaches a padlock 135 through apertures 178, 100 as shown in FIG. 9. Apertures 178, 100 provide the capability to attach multiple padlocks 135 any one of which will prevent handle operator 44 operation.

The padlock 135 includes a hasp 137 that once inserted through apertures 1 78, 100 keeps the slide plate 62 extended from the pocket section 78. Tab 132 prevents the handle operator 44 from moving in slot 40 to the ON position since in order for slide plate 62 to be pulled out, tab 132 must be cleared. Tab 132 is only cleared when the handle operator 44 is in the true OFF position. Thus, the handle operator can only be locked in the true OFF position. As shown in FIG. 9, the length of the slide plate 62 when pulled out extends partly into the ON section 110, through the TRIP section 112 and partly into the OFF section 114. It is noted that the handle operator 44 can not be locked in the ON position when the slide plate 62 is pulled out since tab 132 can not be cleared by the slide plate 62. Therefore, the only position in which the end user can lock the handle operator 44 when the slide plate 62 is pulled out is the OFF position.

The handle operator 44 may be moved within slot 40 to the ON position from the OFF position when the padlock 134 is removed and the slide plate 62 is pushed down. Tab 132 will not permit the handle operator 44 to move from the OFF position to the ON position if the slide plate 62 is extended or pulled out from pocket section 78.

Figure 10:
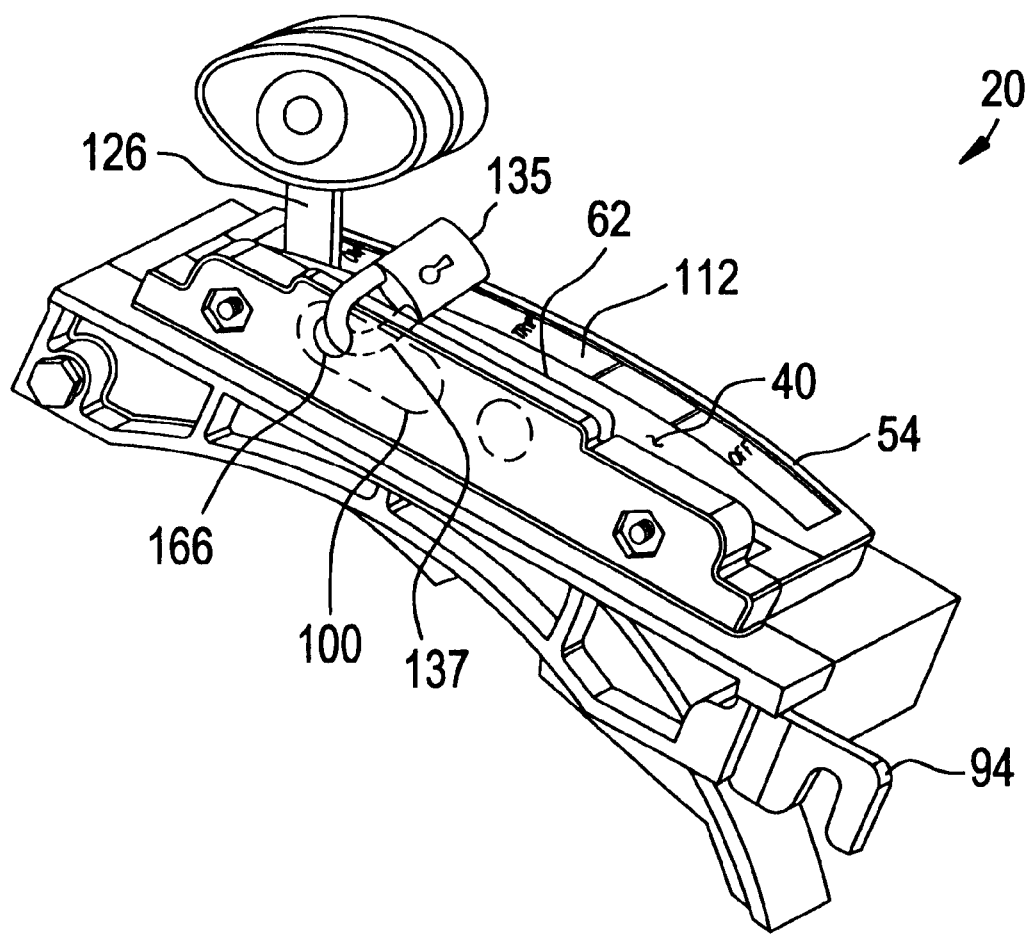
FIG. 10 is a partial perspective view showing the handle operator locked in the ON position.

Referring to FIG. 10, the handle operator assembly 20 is shown locked in the ON position. To lock the handle operator 44 when in the ON position, the end user pushes down the slide plate 62 and drills an aperture 166 through the dimple 162 (FIG. 9). Padlock 135 may then be inserted through aperture 166 and through aperture 100 (shown in phantom). In this way, the hasp 137 of the padlock 135 is in slot 40 adjacent the TRIP section 112 of the indicator segment 54. The handle operator 44 is in slot 40 adjacent the ON section 110 of the indicator segment 54 with the hasp 137 preventing the stem portion 126 from movement in slot 40 out of the ON position.

Referring to FIGS. 4 and 7, the manner in which the handle operating assembly 20 is rotated about a pivot 154 to access the circuit breaker 22 will now be described. FIG. 7 shows the handle operating assembly 20 rotated open about pivot 154 to provide access to the circuit breaker 22.

First, as is shown in FIG. 7, a door 130 located on the motor control center 10 through which the handle operating assembly 20 is exposed to the end user or operator is opened. Next, the mechanical fastener 90 is loosened by approximately about one-half to two threads such that the arm 94 is loosened and can slide free of the cutout 92. The handle operating assembly 20 is then free to rotate about mechanical fastener 58 to expose the circuit breaker 22. The mechanical fastener 90 is only loosed and remains in aperture 98.

Referring to FIGS. 5 and 7, it is also noted that the handle operating assembly 20 can be rotated open when the handle operator 44 is in the OFF, ON or TRIP positions. Further, after rotating open the handle operating assembly 20 as previously described herein, the handle operating assembly 20 is closed or rotated back into the same position (i.e. OFF, ON or TRIP) from which it was opened. If an end user attempts to close the handle operating assembly 20 in a position (i.e. OFF, ON or TRIP) other than that from which it was opened, the link 41, and in particular the L-shaped section 57 will no longer be aligned with opening 55 in the base 53 thereby causing interference that will not permit the handle operator 44 to properly engage.

As described herein, the handle operating assembly 20 provides ease of accessibility to the electrical disconnect switch and ease of assembly. The handle operating assembly 20 can be assembled prior to attachment to the handle support assembly 26. Further, the handle operating assembly 20 is a compact assembly requiring the loosening of the mechanical fastener 90 to access the electrical disconnect switch. Mechanical fastener 90 is loosened, not removed, when it is desired to access the electrical disconnect 22.

Yet another advantage of the handle operating assembly 20 is that the link 41 does not protrude outside the door 130 of the motor control center 10. Thus, the end user can not reach the link 41 when the door 130 is closed resulting in the only way to operated the circuit breaker 22 is to use the handle operating assembly 20.

Finally, it is further noted that the handle operating assembly 20 of the present invention may be used with a variety of motor control centers 10 including and not limited to a dual circuit breaker assembly.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A handle operating assembly suitable for use with an electric disconnect switch assembly having a circuit breaker, the handle operating assembly comprising:
    a handle operator extending outward from the circuit breaker assembly and movable between an ON and an OFF position; and
    a face plate having a slot therein, said handle operator slidably moves in said slot between the OFF position and the ON position, said face plate mounts to the electric disconnect switch assembly and is positionable between a first position to prevent access to the circuit breaker and a second position to provide access to the circuit breaker, wherein said face plate includes a pivot and rotates about said pivot from the first position to the second position.

2. The handle operating assembly of claim 1 wherein said face plate includes:
    a first segment arranged for mating with a second segment and having said slot there between, said handle operator assembles between said first segment and said second segment, said first and second segments mounted to the electric disconnect switch assembly.

3. The handle operating assembly of claim 2 further comprising an indicator segment arranged for mating to said first segment, said indicator segment indicates the OFF and ON positions of the circuit breaker.

4. The handle operating assembly of claim 3 wherein said indicator segment includes a graphics representative of OFF, ON, and TRIP positions, said graphics being visible external to a motor control center.

5. The handle operating assembly of claim 2 wherein said first segment includes an end having a first aperture and an opposing end having a second aperture and said second segment includes an end having a third aperture aligned with said first aperture and an opposing end having a fourth aperture aligned with said second aperture, said first and third apertures accept a first mechanical fastener and said second and fourth apertures accept a second mechanical fastener.

6. The handle operating assembly of claim 5 wherein said first segment includes an arm extending therefrom, said arm releasably fastens the face plate to the circuit breaker assembly to permit movement of the handle operating assembly from the first position to the second position.

7. The handle operating assembly of claim 6 wherein said arm includes a cutout.

8. The handle operating assembly of claim 6 further comprising a screw captured within said cutout of said arm wherein said face plate rotates about said first mechanical fastener in response to loosening said screw thereby providing access to the circuit breaker.

9. The handle operating assembly of claim 1 further comprising:
    a link having a first end and an opposing second end, said second end of said link pivotally attaches to the circuit breaker assembly and said first end of said link releasably engages said handle operator when said face plate is in the first position.

10. The handle operating assembly of claim 9 wherein said first end of said link is L-shaped.

11. The handle operating assembly of claim 9 wherein said handle operator includes a base having an opening on a bottom side and a handle, said handle extends from an opposing top side of said base.

12. The handle operating assembly of claim 9 further including:
    a U-shaped actuator having a top bight and a first and second angled sidearms, said first sidearm and said second sidearm pivotally attach to the circuit breaker assembly positioning the circuit breaker there between; and
    a link member having a first end and a second end, said first end of said link member attaches to said U-shaped actuator and said second end of said link member attaches to said link;
    wherein said handle operator moves in unison with said link thereby urging rotation of said U-shaped actuator.

13. A motor control center comprising:
    a motor control center enclosure;
    a circuit breaker assembly mounted within said motor control center enclosure, said circuit breaker assembly including a circuit breaker; and
    a handle operating assembly, said handle operating assembly mounts to said circuit breaker assembly and is positionable between a first position to prevent access to said circuit breaker and a second position to provide access to the circuit breaker, wherein said handle operating assembly includes a pivot and rotates about said pivot from the first position to the second position.

14. The motor control center of claim 13, wherein said handle operating assembly includes:
    a handle operator extending outward from the circuit breaker assembly and movable between an ON and an OFF position;
    a first segment arranged for mating with a second segment and having a slot therebetween, said handle operator assembles between said first segment and said second segment for slidable movement in said slot between the OFF position and the ON position.

15. The motor control center of claim 14 wherein said handle operating assembly includes an indicator segment arranged for mating to said first segment, said indicator segment indicates the OFF and ON positions of said circuit breaker.

16. The motor control center of claim 15 wherein said indicator segment includes a graphics representative of OFF, ON, and TRIP positions, said graphics being visible external to the motor control center.

17. The motor control center of claim 14 further comprising:
    a link having a first end and an opposing second end, said second end of said link pivotally attaches to said circuit breaker assembly and said first end of said link releasably engages said handle operator when said handle operator assembly is in the first position.

18. The motor control center of claim 17 wherein said first end of said link is L-shaped.

19. The motor control center of claim 17 wherein said handle operator includes a base having an opening on a bottom side and a handle, said handle extends from an opposing top side of said base.

20. The motor control center of claim 17 wherein said circuit breaker assembly includes:
 a U-shaped actuator having a top bight and a first and second angled sidearms, said first and second sidearms pivotally attach to said circuit breaker assembly; and
 said handle operator assembly includes:
  a link member having a first end and a second end, said first end of said link member attaches to said U-shaped actuator and said second end of said link member attaches to said link;
  wherein said handle operator moves in unison with said link thereby urging rotation of said U-shaped actuator.

21. The motor control center of claim 14 wherein said first segment includes an end having a first aperture and an opposing end having a second aperture and said second segment includes an end having a third aperture aligned with said first aperture and an opposing end having a fourth aperture aligned with said second aperture, said first and third apertures accept a first mechanical fastener and said second and fourth apertures accept a second mechanical fastener.

22. The motor control center of claim 21 wherein said first segment includes an arm extending therefrom, said arm releasably fastens said handle operating assembly to said circuit breaker assembly to permit movement of said handle operating assembly from the first position to the second position.

23. The motor control center of claim 22 wherein said arm includes a screw accepting aperture.

24. The motor control center of claim 23 wherein said circuit breaker assembly includes a U-shaped support having a bottom bight and a pair of upstanding first and second sidearms, said second sidearm of said actuator pivotally attaches to said first sidearm of said support, said first sidearm of said actuator pivotally attaches to said second sidearm of said support, said first sidearm of said support having a first aperture and a second aperture and said arm of said handle operating assembly includes a cutout, said cutout aligns with said second aperture of said first sidearm of said support and said first aperture of said first segment aligns with said first aperture of said first sidearm of said support.

25. The motor control center of claim 24, further comprising a first screw captured within said cutout and said second aperture of said support wherein said handle operating assembly rotates about a second screw captured within said first aperture of said first segment, said third aperture of said second segment and said first aperture of said support, in response to loosening said first screw thereby urging said circuit breaker into the second position.

26. A handle operating assembly suitable for use with a circuit breaker assembly having a circuit breaker, the handle operating assembly comprising:
 a handle operator extending outward from the circuit breaker assembly and movable between an ON and an OFF position; and
 a retention means for holding said handle operator, said handle operator slidably moves within said retention means between the OFF position and the ON position, said retention means mounts to the circuit breaker assembly and is positionable between a first position to prevent access to the circuit breaker and a second position to provide access to the circuit breaker, wherein said retention means rotates from the first position to the second position.

* * * * *